United States Patent [19]
Campbell

[11] Patent Number: 6,167,263
[45] Date of Patent: Dec. 26, 2000

[54] AERIAL COMMUNICATIONS NETWORK INCLUDING A PLURALITY OF AERIAL PLATFORMS

[75] Inventor: J. Scott Campbell, New York City, N.Y.

[73] Assignee: Spherecore, Inc., New York, N.Y.

[21] Appl. No.: 09/079,824

[22] Filed: May 15, 1998

Related U.S. Application Data

[60] Provisional application No. 60/046,930, May 16, 1997.

[51] Int. Cl.$^7$ ................................ H04Q 7/20; B64B 1/06
[52] U.S. Cl. ........................ 455/431; 455/13.1; 370/316; 244/190; 244/195; 244/164; 244/96; 244/30; 244/31
[58] Field of Search .................................. 455/12.1, 13.1, 455/13.2, 427, 431, 7, 15; 244/3.13, 3.14, 3.19, 24, 30, 31, 96, 164, 169, 171, 172, 189, 190, 194, 195; 370/316, 326; 342/2

[56] References Cited

U.S. PATENT DOCUMENTS

| | | | |
|---|---|---|---|
| Re. 28,725 | 2/1976 | Hutchinson et al. | 342/353 |
| 2,151,336 | 3/1939 | Scharlau | 342/385 |
| 2,366,423 | 1/1945 | Pear, Jr. | 343/825 |
| 2,462,102 | 2/1949 | Istvan | 342/6 |
| 2,542,823 | 2/1951 | Lyle | 455/11.1 |

(List continued on next page.)

FOREIGN PATENT DOCUMENTS

| | | | |
|---|---|---|---|
| 2 082 995 | 3/1982 | United Kingdom | B64B 1/06 |
| 95/04407 | 2/1995 | WIPO | H04B 7/185 |

OTHER PUBLICATIONS

M. Onda et al., "A Stratospheric Unmanned Powered Lighter–Than–Air Platform", 18th Congress of the International Council of the Aeronautical Sciences, pp. 198–208, Sep. 1992.

Brown, "Balloon Technology Offers High–Altitude Applications", Aviation Week & Space Technology, pp. 56 and 57, Nov. 1992.

Croutch, "Balloon and Airship", Compton's Interactive Encyclopedia, Dec. 1993.

Wilson, "Countdown Begins for Earth–Orbiting Balloons", Popular Mechanics, pp. 19, May 1997.

*Primary Examiner*—Edward F. Urban
*Assistant Examiner*—Rafael Perez-Gutierrez
*Attorney, Agent, or Firm*—White & Case LLP

[57] ABSTRACT

A global communications network comprises a plurality of aerial platforms or vehicles deployed at an altitude in or near the stratosphere and permitted to drift in a controlled manner such that each platform adjusts its position relative to other aerial platforms. Each aerial platform has a propulsion system and control surfaces and preferably includes a lighter-than-air component to maintain lift in an economical manner. Each aerial platform also includes a payload, means for communicating with other aerial platforms and a control system including location-finding equipment and a processor adapted for directing the platform's propulsion system and control surfaces to effectuate changes in the aerial platform's position relative to other aerial platforms based on position information, and optionally on other factors such as terrestrial demand for services provided by the payload of the aerial platforms. The communications network according to the present invention accordingly provides a self-adjusting network for creating and maintaining a global communications link optionally capable of interoperating with one or more orbiting communications satellites or with ground, air or sea-based equipment.

18 Claims, 12 Drawing Sheets

U.S. PATENT DOCUMENTS

| | | | |
|---|---|---|---|
| 2,598,064 | 5/1952 | Lindenblad | 455/11.1 |
| 2,626,348 | 1/1953 | Nobles | 455/11.1 |
| 3,030,500 | 4/1962 | Katzin | 342/367 |
| 3,045,952 | 7/1962 | Underwood | 244/33 |
| 3,174,705 | 3/1965 | Schiff et al. | 244/172 |
| 3,206,749 | 9/1965 | Chatelain | 342/10 |
| 3,384,891 | 5/1968 | Anderson | 342/357.01 |
| 3,404,278 | 10/1968 | Chope | 455/66 |
| 3,471,856 | 10/1969 | Laughlin, Jr. et al. | 342/50 |
| 3,742,358 | 6/1973 | Cesaro | 455/9 |
| 3,781,893 | 12/1973 | Beukers et al. | 343/702 |
| 3,781,894 | 12/1973 | Ancona et al. | 343/706 |
| 4,262,864 | 4/1981 | Eshoo | 244/31 |
| 4,472,720 | 9/1984 | Reesor | 342/388 |
| 5,239,668 | 8/1993 | Davis | 455/429 |
| 5,287,541 | 2/1994 | Davis et al. | 455/427 |
| 5,415,367 | 5/1995 | Horstein et al. | 244/158 R |
| 5,433,726 | 7/1995 | Horstein et al. | 244/158 R |
| 5,439,190 | 8/1995 | Horstein et al. | 244/158 R |
| 5,471,641 | 11/1995 | Dosiere et al. | 455/13.1 |
| 5,645,248 | 7/1997 | Campbell | 244/30 |
| 5,678,175 | 10/1997 | Stuart et al. | 455/13.1 |
| 5,810,284 | 9/1998 | Hibbs et al. | 244/13 |

| Linguistic Input Variables | 2 |
|---|---|
| Linguistic Output Variables | 1 |
| Intermediate Variables | 0 |
| Rule Blocks | 1 |
| Rules | 9 |
| Membership Functions | 9 |

Fig 8A

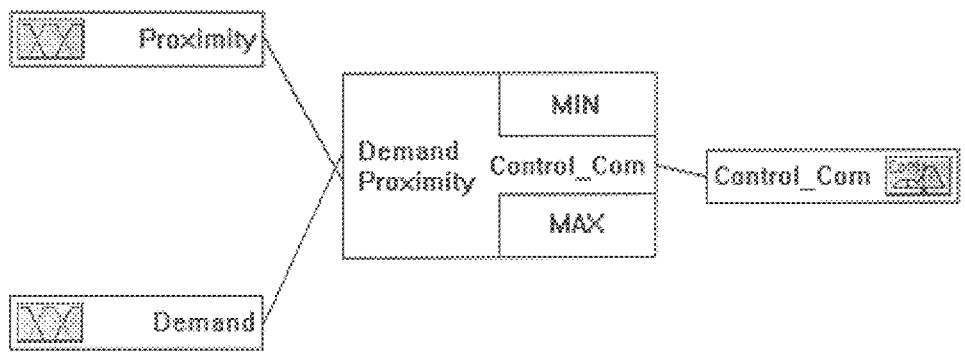

Figure 8B

| Variable Name | Type | Term Names |
|---|---|---|
| Demand | Input | low, medium, high |
| Proximity | Input | close, optimal, far |
| Control_Comand | Output | mv_closer, stay_put, move_away |

Fig 8 C

| Input Variable | Min | Max | Base Var. Unit | Fuzzification |
|---|---|---|---|---|
| Demand | 0 | 255 | Units | Compute MBF |
| Proximity | 0 | 1000 | Miles | Compute MBF |

Fig 8 D

| Output Variable | Min | Default | Max | Base Var. Unit | Defuzzification |
|---|---|---|---|---|---|
| Control_Comand | -5 | 0 | 5 | Units | CoM |

| Term Name | Shape/Par. | Definition Points (x, y) | | |
|---|---|---|---|---|
| mv_closer | linear | (-5, 0) | (-5, 1) | (-0.0002, 0) |
| | | (5, 0) | | |
| stay_put | linear | (-5, 0) | (-5, 0) | (-0.0002, 1) |
| | | (5, 0) | (5, 0) | |
| move_away | linear | (-5, 0) | (-0.0002, 0) | (5, 1) |
| | | (5, 0) | | |

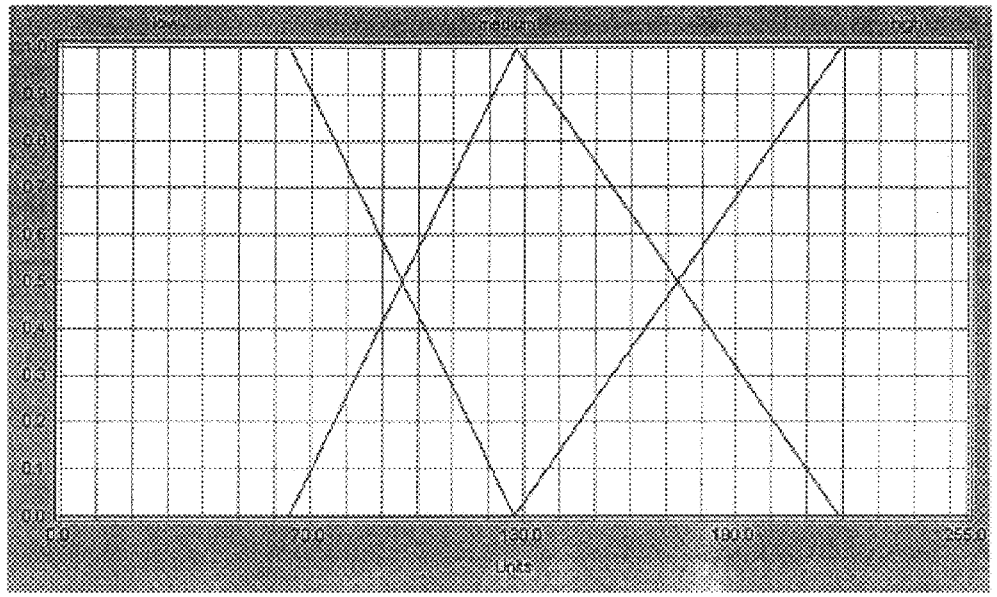
Figure 8H
| Term Name | Shape/Par. | Definition Points (x, y) | | |
|---|---|---|---|---|
| low | linear | (0, 1) (255, 0) | (63.745, 1) | (127.495, 0) |
| medium | linear | (0, 0) (219.345, 0) | (63.745, 0) (255, 0) | (127.495, 1) |
| high | linear | (0, 0) (255, 1) | (127.495, 0) | (219.345, 1) |
Fig 8 I
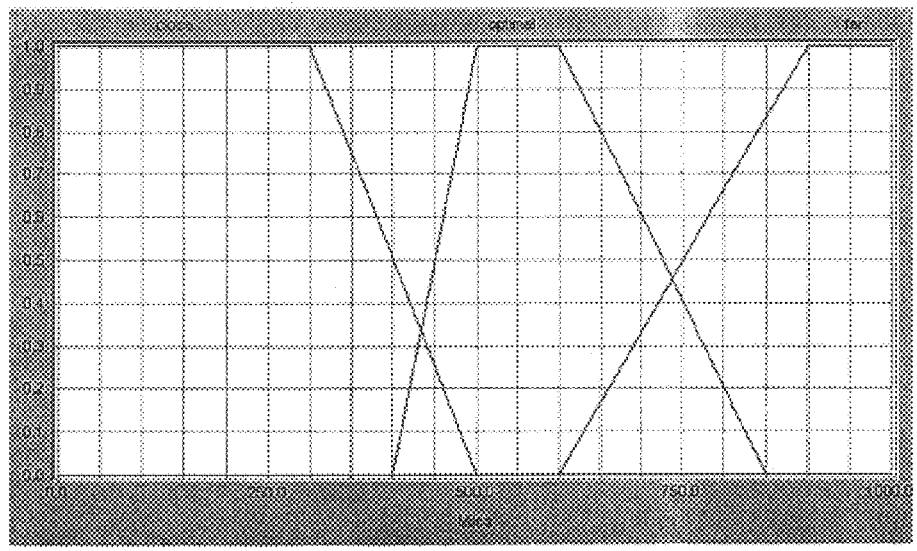
Figure 8J

| Term Name | Shape/Par. | Definition Points (x, y) | | |
|---|---|---|---|---|
| close | linear | (0, 1) <br> (1000, 0) | (300, 1) | (500, 0) |
| optimal | linear | (0, 0) <br> (600, 1) | (400, 0) <br> (850, 0) | (500, 1) <br> (1000, 0) |
| far | linear | (0, 0) <br> (1000, 1) | (600, 0) | (900, 1) |

Fig 8 K

| IF | | THEN | |
|---|---|---|---|
| Demand | Proximity | DoS | Control_Comand |
| low | close | 1.00 | move_away |
| medium | close | 1.00 | move_away |
| high | close | 1.00 | stay_put |
| low | optimal | 1.00 | stay_put |
| medium | optimal | 1.00 | stay_put |
| high | optimal | 1.00 | mv_closer |
| low | far | 1.00 | mv_closer |
| medium | far | 1.00 | mv_closer |
| high | far | 1.00 | mv_closer |

Fig 8 L

AERIAL COMMUNICATIONS NETWORK INCLUDING A PLURALITY OF AERIAL PLATFORMS

RELATED APPLICATIONS

This application claims the benefit, under 35 U.S.C. §119(e), of U.S. Provisional Patent Application Ser. No. 60/046,930, filed May 16, 1997.

FIELD OF THE INVENTION

The present invention relates in general to the field of communications and, in particular, to communications networks.

BACKGROUND OF THE INVENTION

Communications systems presently depend upon either earth based systems of wires, cables, microwave towers, wireless networks or earth-orbiting satellites. Each of these two delivery systems suffers from a variety of limitations. In the case of ground (or sea) based communications systems, the cables must be laid, or microwave towers or wireless base stations erected, incurring heavy financial and even political costs. The services provided by ground-based systems may prove to be economically attractive only where the population density of potential subscribers is substantial. Moreover, the elements of such terrestrially based, hardwired systems require periodic maintenance and upgrading, also at great expense.

Satellite-based communications networks suffer from their own shortcomings. Most conspicuously, they cannot be placed into service without being boosted by rockets. Rocket technology is an extraordinarily expensive means for placing a platform into service. The fact that rockets have a high failure rate increases both the risk of loss and the cost of launch due to insurance. The use of rockets also incurs serious environmental costs, since most commercially used rockets produce thousands of tons of toxic emissions each time they are launched.

Furthermore, the nature of satellite orbits imposes certain constraints on their utility. Satellites placed in geostationary orbit (of which there is only one, located approximately 22,291 miles above the earth's equator) are limited in terms of the number of available positions or "slots." The great distance of geostationary satellites from the earth leads to significant attenuation of signals transmitted to and received from these platforms. To cope with this attenuation, either expensive ground-based equipment or larger, more powerful satellites must be used. The distance of geostationary satellites from the earth also introduces non-trivial delays in the delivery of signals.

Satellites placed in low-earth orbit, while more attractive than geostationary satellites from the standpoint of deployment costs, signal attenuation and delay, nevertheless suffer from their own infirmities. Perhaps the chief among these is that the speeds at which the satellites traverse regions of the earth confine the duration of suitable transmission periods to mere minutes. The provision of meaningful communications coverage accordingly requires the use of many such satellites in conjunction with a complex yet robust system for controlling communications among them.

Certain systems that would employ one or more lighter than air platforms deployed in the atmosphere have been proposed as an alternative to the existing ground-based and space-based communications network options. These proposed systems employ an approach in which each platform is intended to maintain a fixed position or station above the earth in the face of environmental disturbances. This approach consumes a great deal of energy, however, and requires that the platform be outfitted, at great expense and increase in weight, with an on-board source of, or means of capturing, the necessary energy.

SUMMARY OF THE INVENTION

The present invention provides a solution to many of the problems encountered in the deployment and use of existing communications network alternatives.

In one embodiment, the present invention provides a communications network comprising a plurality of aerial platforms that are distributed in the atmosphere and permitted to drift. Each platform is adapted to receive signals from other platforms in the network and is further adapted to adjust its position with respect to the platforms according to a decision rule.

At least one of the platforms in the communications network may comprise a payload adapted according to known methods for communication with equipment located on the earth (either ground or sea-based), aboard an airborne vehicle or aboard a satellite, or adapted for other functions, such as photography or other observation.

The present invention also comprises a method for providing communications services over a geographic area on the earth. In one embodiment, the method first distributes in the atmosphere a network of aerial platforms, each platform adapted for communications with other such platforms and further adapted to adjust its position relative to other platforms. Then, the platforms are permitted to drift relative to the earth. Each platform is controlled in order to adjust, while drifting, its position with respect to a set of neighboring platforms.

An embodiment of an individual aerial platform for use in a communications network employing a plurality of such platforms comprises a lighter than air vehicle adapted for directional propulsion in response to a control signal and for remaining airborne for a period of time. Such a platform also comprises communications electronics coupled to the vehicle for sending signals to and receiving them from other airborne platforms. In addition, the individual aerial platform comprises control electronics coupled to the communications electronics and adapted to generate a control signal for directing the vehicle in response to signals received from other airborne platforms.

In another embodiment, a communications network according to the present invention may comprise a plurality of aerial platforms distributed in a preselected altitude range in the atmosphere. The aerial platforms, which are permitted to drift, are each adapted to receive signals from other platforms in the network.

In another embodiment of the communications network according to the present invention, a communications network includes a plurality of aerial platforms distributed in the atmosphere in a preselected latitude range. The aerial platforms, which are permitted to drift, are each adapted to receive signals from other platforms in the network.

Accordingly, it is an object of the present invention to provide a system of inexpensive aerial platforms that can be deployed to form a communications network.

It is also an object of the present invention to provide a system of aerial platforms that can be inexpensively deployed as a communications network.

It is another object of the present invention to provide a system of aerial platforms deployed as a communications network in which the aerial platforms are permitted to drift with prevailing winds but which nevertheless adjust their position relative to one another in order to maintain desired coverage by the network.

It is a further object of the present invention to provide a system of aerial platforms capable of establishing a robust, adaptable communications network in which the failure of a particular platform will not cripple the performance of the network, nor represent a catastrophic loss to investors.

It is an additional object of the present invention to provide a system of aerial platforms that can be deployed as a communications network without the creation of toxic emissions or space debris.

It is yet another object of the present invention to provide a system of aerial platforms that can be deployed as a communications network that operates in conjunction with orbital communications satellites.

It is still a further object of the present invention to provide a communications network including a plurality of aerial platforms deployed in a preselected altitude range in the atmosphere and permitted to drift.

An additional object of the present invention is to provide a communications network including a plurality of aerial platforms distributed in the atmosphere in a preselected latitude range and permitted to drift.

BRIEF DESCRIPTION OF THE DRAWINGS

FIGS. 8A–8L provide the definition for a fuzzy logic control algorithm for an embodiment of an aerial platform according to the present invention.

DETAILED DESCRIPTION OF THE INVENTION

The communications system according to the present invention provides a network of aerial platforms that are lighter than air and that are deployed into the atmosphere, wherein their positions relative to one another are adjusted via a controlled drift strategy. As described below, the control is preferably (although not necessarily) implemented through a distributed approach in which each platform has on board its own processor and implements a suitable control law.

The principle of controlled drift according to the present invention recognizes that the earth's atmosphere is continually in motion and that maintenance of a particular position above the earth requires that such atmospheric disturbance be overcome. According to the present invention, aerial platforms are permitted to migrate with the winds in the atmosphere, minimizing the energy necessary to counteract motion due to such winds.

Because atmospheric winds are neither uniform nor perfectly predictable, the relative positions of aerial platforms deployed in the atmosphere in general will not remain constant. According to the present invention, and as described in detail below, control and propulsion systems aboard each of the aerial platforms are directed to the reduction or minimization of errors in the relative positions of each aerial platform relative to the others, based on signals received from neighboring aerial platforms, ground stations, satellites, aircraft, or seagoing vessels. The control can also be directed to the optimization of other factors, such as the demand for the services of the aerial platform payload resources (e.g., communications, sensing, or other function) at a particular location.

Figure 1:
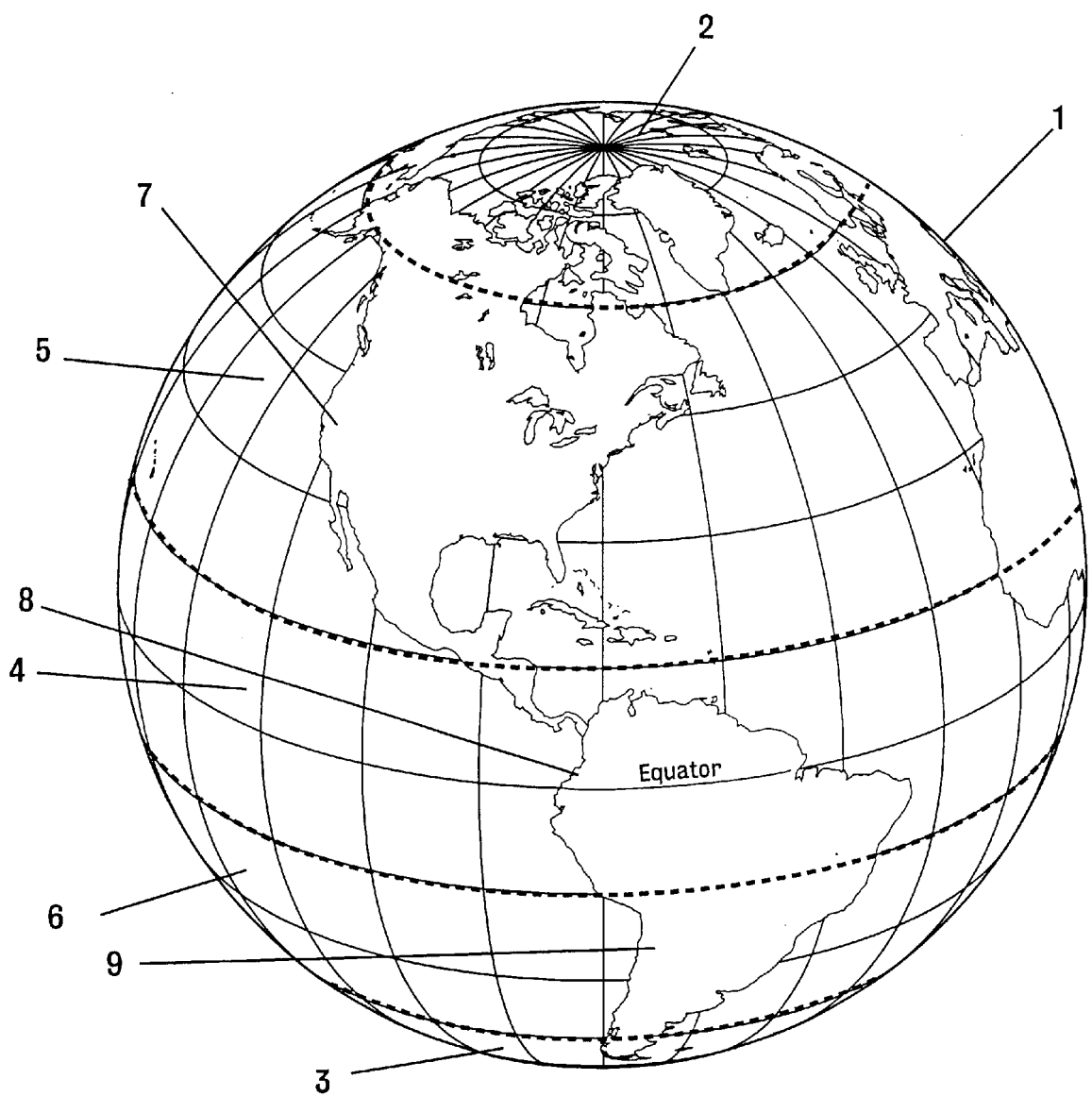
FIG. 1 shows a projection of the earth and its major wind zones.

The system according to the present invention for the controlled drift of a network of aerial platforms through the earth's atmosphere recognizes and takes advantage of certain features of atmospheric behavior. The stratosphere, in which the aerial platforms are preferably deployed, comprises several zones. These zones are illustrated in FIG. 1. Specifically, the atmosphere of the earth 1 includes five major wind systems or "circulatory zones." The polar regions 2, 3 are characterized by winds that are confined to those regions and that circulate around each pole. In addition, winds in an equatorial zone 4 tend to remain confined within that zone, while the winds in northern temperate zone 5 and southern temperate zone 6 each tend to remain respectively within those zones. Little cross-over of wind occurs between these zones. For information regarding this and other atmospheric phenomena pertinent to the practice of the present invention, see D. G. Andrews and J. R. Holton, *Middle Atmospheric Dynamics*, Academic Press, Inc., 1987, the contents of which are herein incorporated by reference in their entirety. Thus, an aerial platform launched within a particular zone enjoys a high probability of remaining in that zone when the platform is capable of directional control.

The relatively narrow equatorial zone 4 (15° North latitude to 15° South latitude) is characterized by a Quasi-Biannual-Oscillation ("QBO") pattern, in which wind velocities decrease to zero, reverse direction and then increase again, approximately every two years. An economical global aerial network according to the present invention could thus be deployed in this equatorial zone 4.

Figure 2:
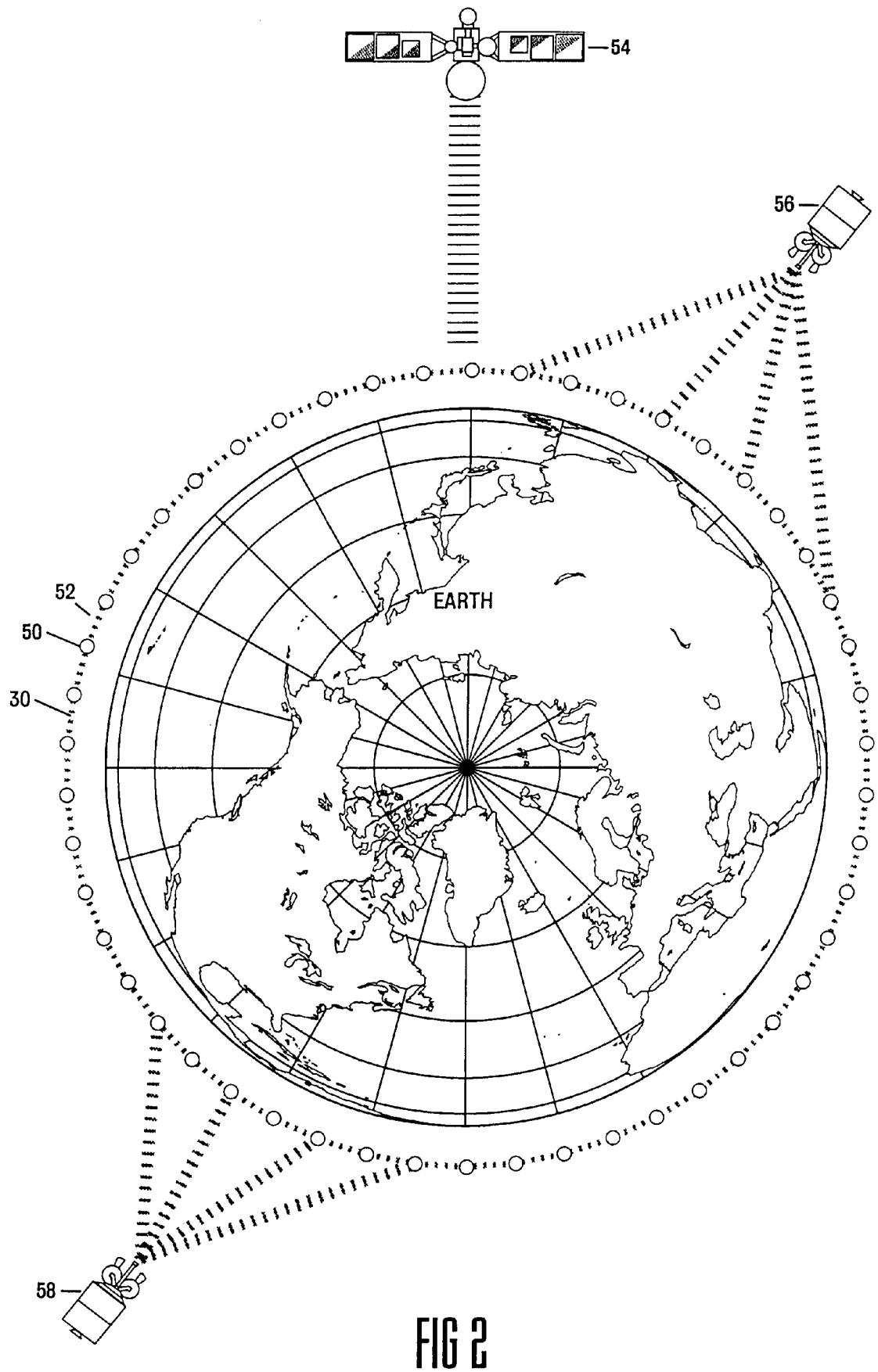
FIG. 2 shows a network according to the present invention distributed about the equator of the earth in communication with a plurality of orbital satellites.

FIG. 2 shows a network of fifty aerial platforms 50 distributed about the equator and operating above 60,000 ft. (18.28 km) to create a global link 30. Platforms 50 signal with each other (e.g., via transmission 52) and also via orbiting satellites 54, 56 and 58. Launching into the tropical zone should represent the quickest and least expensive way to create a global network that would provide service to consumers in the tropics.

Referring back to FIG. 1, in the northern or southern temperate zones (5, 6), a network of 200 aerial platforms operating at 120,000 feet (36.5 km) should be sufficient to create a globally linked network covering a majority of the populated areas of the earth. The deployment of 400 to 600 vehicles in zone 5 or 6 should provide nearly 99% coverage. Since the aerial platforms according to the present invention are lighter-than-air ("LTA") platforms, their launch entails releasing each platform from a suitable site within the desired zone.

As shown in FIG. 1, for platforms that are intended to operate in the circulatory zones of greatest commercial interest, northern temperate 5, equatorial 4, or southern temperate 6 zones, the aerial platforms could be launched, respectively, from site 7 (in North America), site 8 (in Central America) or site 9 (in South America). Multiple launch sites in other areas of the world could also be selected. For a communications system with global, temperate zone coverage, one or more launch sites in all of the three zones 4, 5 and 6 would be required. A schedule for launching could proceed at one platform every other day; for a network of 500 platforms, this schedule would lead to the establishment of a network in well under one and a half years. The platforms may be launched using known techniques and procedures developed for launching large stratospheric balloons, which have been developed by NASA and other organizations. For information regarding the launching of balloons that is pertinent to the practice of the present invention see, for example, A. Morris, *Scientific Ballooning Handbook*, National Center for Atmospheric Physics, NCAR/TN/IA-99, May, 1975, the contents of which are herein incorporated by reference in their entirety.

At least two launch sites would preferably be identified in each atmospheric circulatory zone. These launch sites should be geographically separated from one another and located on different continents or oceans. With two launch sites rather than one, the time for deployment of a global system could be reduced by up to 50%.

Figure 3:
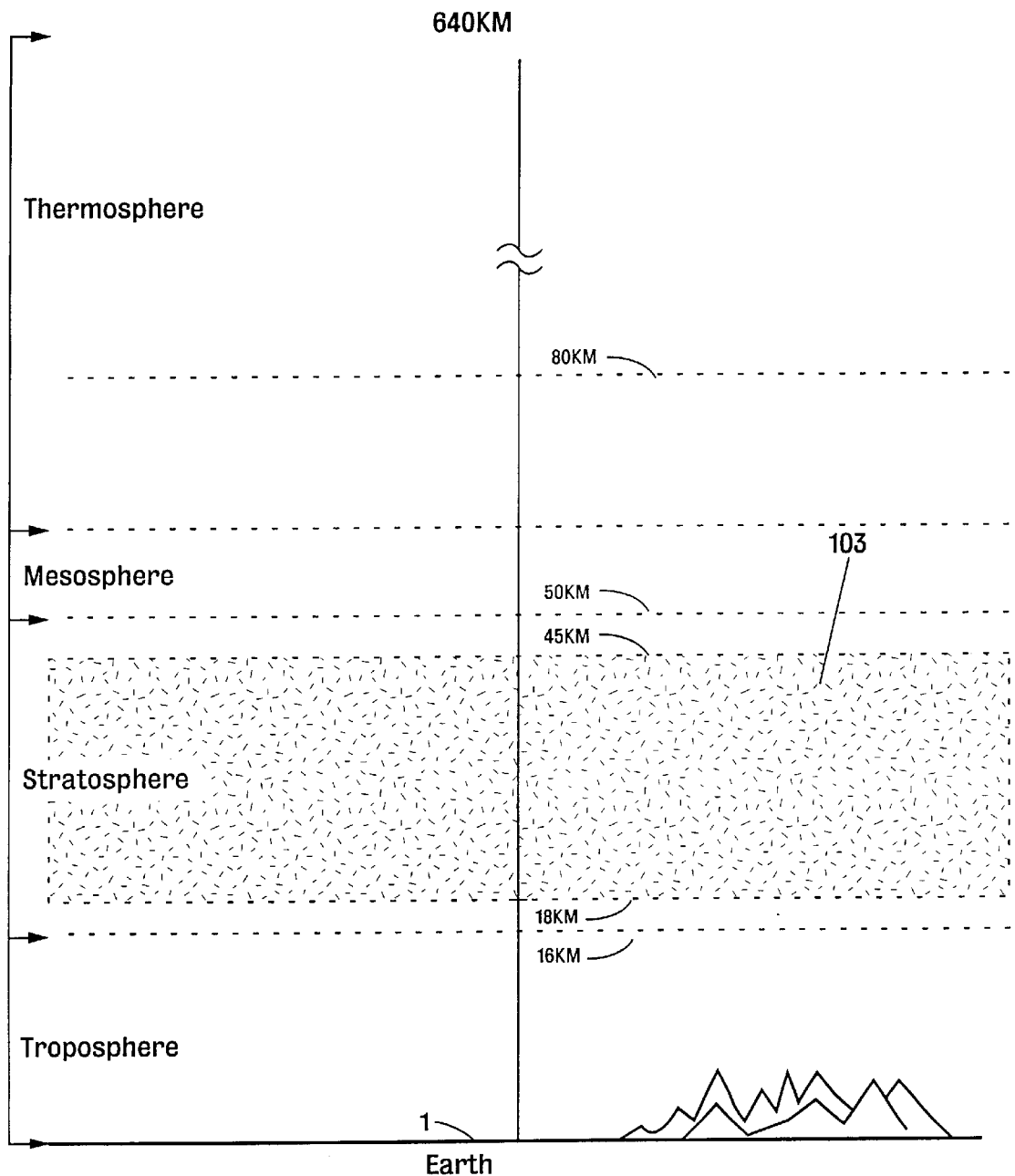
FIG. 3 shows an elevational view of the earth's atmosphere and a preferred region of operation by aerial platforms according to the present invention.

FIG. 3 shows an elevational view of the atmosphere of the earth 1. The atmosphere comprises the troposphere (0–16 km), the stratosphere (16 km–50 km), the mesosphere (50 km–80 km) and the thermosphere (80 km–640 km). The preferred range of operating altitude for the aerial platforms of the communications network according to the present invention is indicated by reference numeral 103 and spans the zone from 18 km–45 km. Below 18 km, the presence of moisture-driven weather patterns complicates the control requirements for the aerial platforms. Furthermore, activity in the airspace below that altitude is regulated by the Federal Aviation Administration in the United States and analogous administrative agencies outside the United States. At altitudes above 45 km, on the other hand, the atmosphere is so thin that LTA vehicles (i.e., balloons) are rendered impracticably huge and too difficult to power and control for purposes of the present invention.

A wide variety of LTA vehicles could be suitable for use in the communications network according to the present invention. Since only the relative positions of the aerial platforms need to be adjusted, and since the errors in these positions are not expected to grow at a high rate, the aerial platforms do not need to be capable of moving at a high rate of airspeed. The required airspeed is an inverse function of the number of deployed platforms; that is, the greater the number of platforms, the lower the necessary airspeed.

Figure 4:
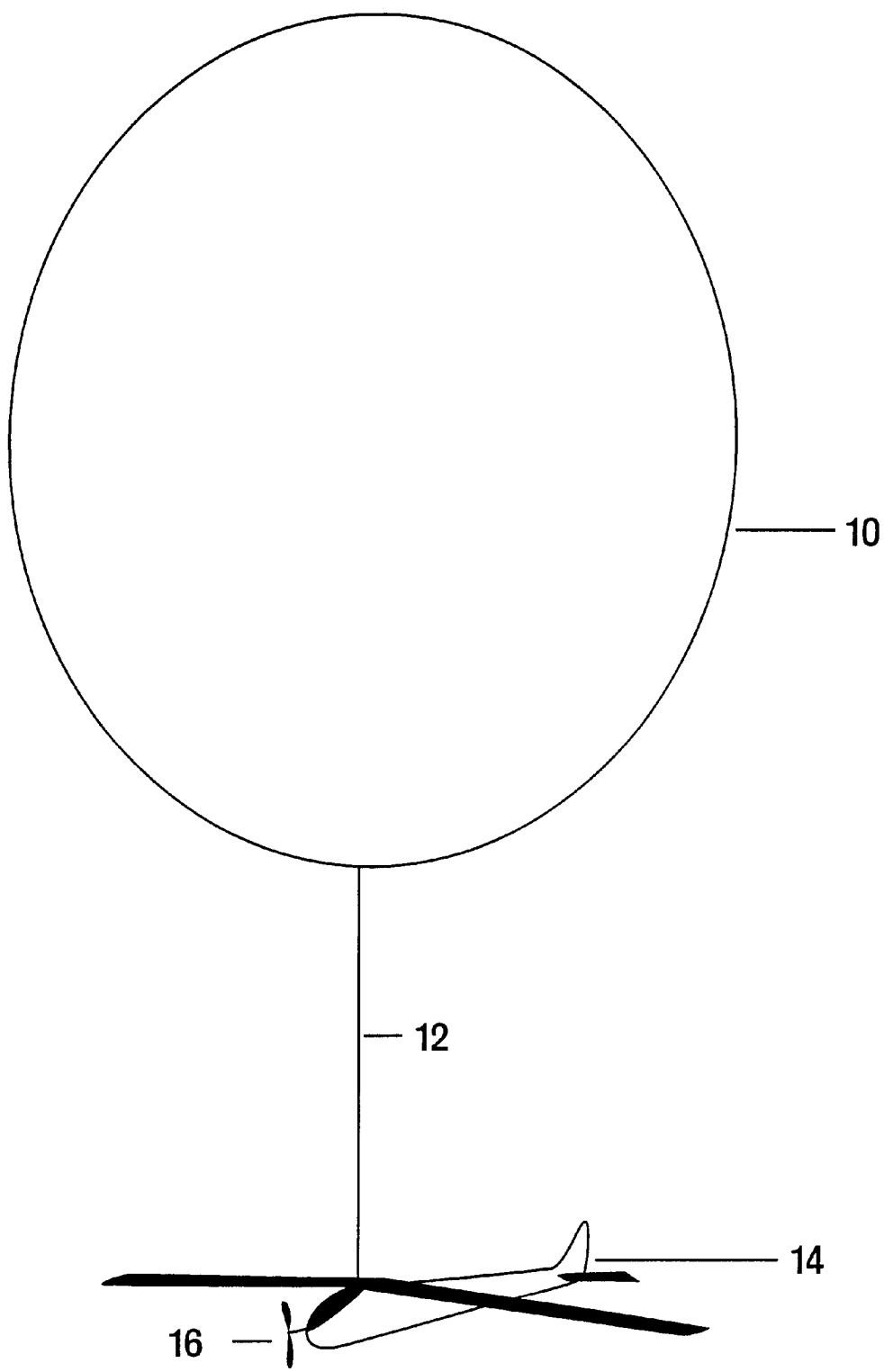
FIG. 4 shows an embodiment of a vehicle suitable for use as an aerial platform in the system according to the present invention.

One example of an aerial platform is shown in FIG. 4. The lighter-than-air (LTA) vehicle in FIG. 4 is a hybrid vehicle comprising an envelope (balloon) 10 filled with a lighter than air gas for providing lift, a tether 12 of suitable strength, and a heavier than air, winged unmanned aviation vehicle ("UAV") 14. (Not shown, but present on UAV 14, are a payload, communications equipment and a control system (described below in connection with FIG. 6) for implementing the aerial platform control law). The payload may comprise known means for communication with equipment located on the earth, such as a ground-based telecommunications station, sea-based communications equipment, or with communications equipment aboard an airborne vehicle, or on a satellite in orbit around the earth. In addition, or alternatively, the payload may comprise known means for conducting observation, for example, without limitation, taking photographs. The UAV 14 includes a motor (not shown), a propulsor 16 and control surfaces suitable for maintaining heading, altitude and vehicle attitude. The sizing of motor and propulsor 16 can be selected according to known methods as a function of the lifting capacity of envelope 10 and the dimensions of UAV 14 to enable the aerial platform to achieve a particular design speed, preferably at least approximately 0.5 km/hr. UAV 14 also includes a tether release mechanism (not shown) implementable according to known methods, which permits the envelope 10 to be disengaged from UAV 14 at an appropriate time. Thus, when the balloon 10 or the UAV 14 approaches its design life, or in the event of a failure, or if for some other reason the operator of the network comprising the aerial platforms desires it, UAV 14 can jettison tether 12 and envelope 10 and autonomously return to earth.

Alternatively, controlled descent of UAV 14 with envelope 10 may be possible and desirable, taking into account that separation of the UAV 14 and envelope 10 prior to descent into commercial airspace would be recommended for safety reasons. For instance, while it could be preferable to release the payload such that the payload would execute a controlled descent to land at an intended recovery site, the envelope 10 could be allowed to float until it is over the ocean, or other location where its landing would be benign, and then cut down.

Alternative suitable vehicles for use as aerial platforms in connection with the present invention could include any LTA craft that could operate for a significant period of time in the stratosphere, including gas-filled blimps, rigid, non-rigid, or semi-rigid airships, solar-powered hot air balloons or airships, superpressure and constant volume balloons, or other suitable vehicles. One example is the annular LTA vehicle disclosed in U.S. Pat. No. 5,645,248, which issued Jul. 8, 1997, the contents of which patent are herein incorporated by reference in their entirety. Unmanned aviation vehicles capable of remaining aloft for long periods could also be used without being coupled to lifting envelopes.

The aerial platforms making up a network according to the present invention need not be implemented with powered vehicles, however. Since the aerial platforms are generally permitted to drift, the platforms only need to be steerable—provided that the control law for the aerial platforms takes this limitation into account. The use of non-powered, steerable aerial platforms reduces the number of degrees of freedom available to each platform and thus, in general, can be expected to reduce the optimization options available to the designer of the communications network and increase the number of platforms for necessary commercial requirements.

Figure 5:
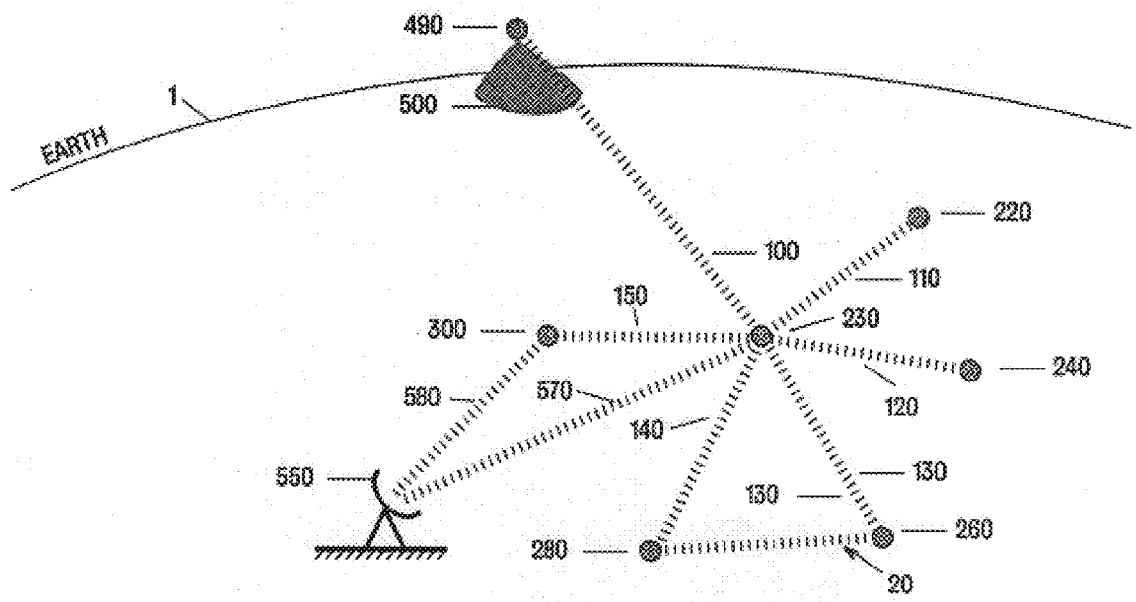
FIG. 5 shows a subset of a network of aerial platforms according to the present invention operating over a portion of the earth's surface.

FIG. 5 shows a portion of the earth 1 and a region 500 of high demand for the services of an embodiment of the communications network 20. Only a subset of the communications network 20 is shown, specifically, aerial platforms 220, 230, 240, 260, 280, 300, and 490. Platform 490, in the vicinity of region 500, receives communications from platform 230 via radio transmission 100 (the shaded cone indicating communication occurring between platform 490 and region 500). This and all communications between aerial platforms are line of sight transmissions. The maximum distance between aerial platforms is dictated by the frequency and power of the transmissions, associated attenuation losses, and the altitude at which the platforms are deployed. At 60,000 feet, the maximum line of sight distance between vehicles before the sightline is broken by the earth is approximately 600 miles; at 120,000 feet the maximum distance is 825 miles. Ground relays or satellite links can be used to increase greatly the acceptable separation between any two platforms, while maintaining communication links with the platforms.

Platform 230 also communicates with platform 220 via transmission 110, platform 240 via transmission 120, platform 260 via transmission 130, platform 280 via transmission 140, and platform 300 via transmission 150. Transmissions 100, 110, 120, 130, 140 and 150 are preferably identical—i.e., one single broadcast—but may alternatively be targeted at each particular platform. Ground station 550 communicates with platform 230 via radio transmission 570 and with platform 300 via transmission 580. A signal originating from ground station 550 can be propagated to region 500 via platforms 230 and 490.

Figure 6:
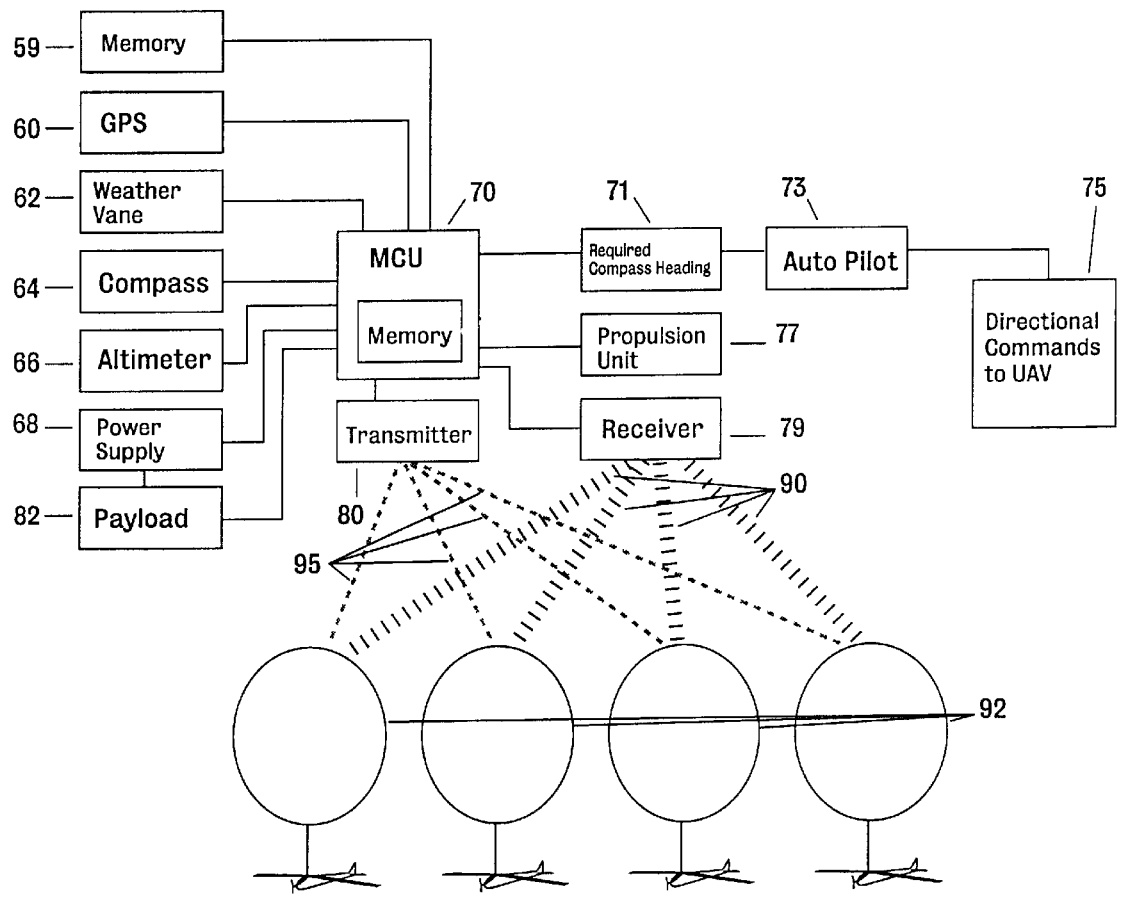
FIG. 6 is a block diagram of a control system for an aerial platform according to the present invention.

FIG. 6 is a block diagram of a control system for an embodiment of an aerial platform according to the present invention. The control system includes a suite of sensors, including a global positioning system (GPS) 60, a weather vane 62, a compass 64 and an altimeter 66. The control system is also coupled to a power supply 68, in a suitable arrangement according to known methods, and to payload 82, which comprises mission-specific equipment. (Leads from power supply 68 to other electrical components in the control system are not shown). Each of the foregoing components of the control system is coupled to microprocessor control unit (MCU) 70, which receives signals from each of those components as inputs and which can store data in, and retrieve it from, memory 59 as needed. MCU 70 is also coupled to, and sends output signals (in the form of a required compass heading 71) to auto pilot 73, a suitable auto pilot systems according to known methods, which in turn sends directional commands to the propulsor 16 and control surfaces of UAV 14. Autopilot 73 may be implemented according to methods familiar to those skilled in the art. The reader is referred, for example, to Autopilots such as those made by Century Flight Systems of Mineral Wells, Texas, or by Bendix/King of Olathe, Kans., or by STEC, also of Mineral Wells, Tex., which could be adapted for use in this embodiment. MCU 70 also is coupled to and sends output signals to propulsion unit 77, receiver 79 and transmitter 80. Transmitter 80 transmits radio signals 95 to aerial platforms 92, while receiver 79 receives radio transmissions 90 from the aerial platforms 92. Transmitter 80 preferably transmits signals 95 in a narrow band of the electromagnetic spectrum; for maximum efficiency, the transmitters for each aerial platform may share the same band.

In an embodiment of the aerial network according to the present invention, each aerial platform 92 has a unique identification number and a unique time slot in which it broadcasts its identification number and other information. The time slot for a given aerial platform 92 is a particular interval in a preselected clock cycle maintained in synchronization according to known methods among all the aerial platforms 92 of the network. Each MCU 70 aboard each aerial platform 92 implements a clock, and counts through the clock cycle in a synchronized manner. The clock cycle and the number of slots in each cycle are selected so that each aerial platform 92 can broadcast its unique identifying number and other information without conflicting with the broadcast of another aerial platform 92. If the clock cycle were selected to be two minutes in length, for example, and this cycle were divided into 1200 time slots, up to 1199 vehicles could operate in the network. The length of the clock cycle depends upon the number of aerial platforms and the speed of MCU 70. Given the comparatively slow speeds at which the aerial platforms 92 are expected to travel, particularly with respect to one another, two minutes may be a sufficient interval between the issuing of control signals by each aerial platform 92, to maintain an appropriate spacing between the aerial platforms 92 in the network.

The control signal 95 broadcast by each aerial platform 92 preferably includes not only a unique identification number, but also the output of GPS 60 (to which on-board compass 64 may serve as partial back-up) and information sufficient to represent the operational status of the aerial platform 92. The operational status of the aerial platform 92 preferably includes an indication of (1) the physical condition of the aerial platform (minimally, whether the platform is operational or whether anything threatens its operation) and (2) the demand for the services of the payload of the aerial platform. This demand would be inferred from payload 82, and is a userdefinable, mission-dependent measure (e.g., telecommunications circuits, bits per second or other appropriate unit). For example, if payload 82 were a cellular switch, the demand would be a function of the traffic being handled by the switch. In addition to the unique identifier, heading and operational status, other suitable information could be transmitted as well.

When a portion of the clock cycle in which an aerial platform 92 is not transmitting its unique identifier and other information, receiver 79 of the aerial platform 92 receives signals in a preselected frequency band. At the end of a clock cycle, MCU 70 calculates, based on the information it received during the entire clock cycle and according to logic described below, a required compass heading 71. This heading is sent to auto pilot 73, which produces directional commands 75 for the UAV 14.

MCU 70 may be a microcontroller chip such as a Motorola 68HC12 having a built-in fuzzy logic instruction set kernel from Inform Software Corporation. Other suitable processors and instruction sets also could be used. Fuzzy logic is a rigorous, formal logical discipline developed by Lotfi Zadeh and others that provides, among other advantages, a heuristic means for specifying decision making and control laws for dynamical systems. See, for example, C. von Altrock, *Fuzzy Logic and Neurofuzzy Applications Explained*, Prentice-Hall, 1995, the contents of which are herein incorporated by reference in their entirety. As described in detail below in connection with one embodiment of the present invention, the control algorithm for a particular aerial platform 92 implemented by MCU 70 determines, based on the signals 90 received from the other aerial platforms, the closest neighboring platforms in the network that are closest to that aerial platform 92. The content of these signals 90 are sorted and used to compute an appropriate heading for the subject platform.

Many approaches to determining an appropriate control action for each aerial platform 92 are possible. One approach computes the control action, including propelling the platform toward an appropriate heading, as a function of the set of nearest neighboring aerial platforms 92 using fuzzy logic implemented with FuzzyTech™ software from Inform Software Corporation. In one embodiment of the algorithm according to the present invention, two inputs to the fuzzy logic program are (1) distance to a particular aerial platform 92 and (2) demand for the services of the payload of that platform. These values are extracted from the transmissions 90 received from other aerial platforms 92. Distance is most preferably determined through conventional means based on readings from GPS 60. Alternatively, distance could be estimated based on signal strength measurement techniques and modeling of free space or non-free space signal propagation and attenuation. Based on the distance information, MCU 70 creates a list of the five closest aerial platforms.

Figure 7:
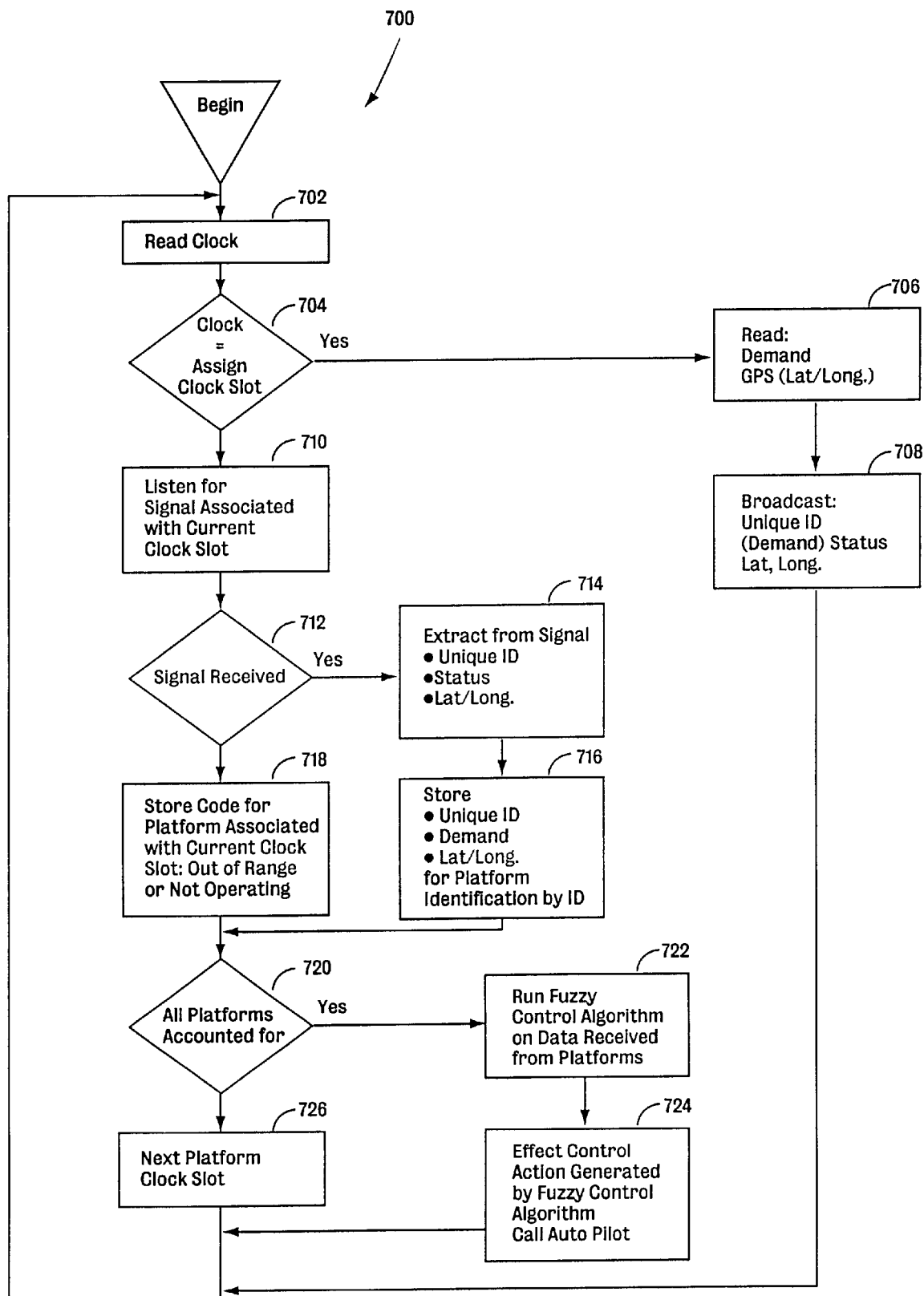
FIG. 7 shows a flowchart of the processing logic of an embodiment of a control system for an aerial platform according to the present invention.

Logic for an embodiment of an aerial platform 92 according to the present invention, and implemented by MCU 70, is shown in FIG. 7 at flowchart 700. The logic executes a loop that begins by reading the clock at step 702 (which clock may be implemented by MCU 70 or another device (not shown)). The clock cycles through a preselected number of time slots comprising a clock cycle for the given network. The logic first determines whether the present time slot is the one assigned for this particular aerial platform 92. If so, the MCU 70, at 706, reads one or more values from the payload 82 and, depending upon mission specific logic (beyond the scope of the present invention and not disclosed here) generates a value representative of a "demand" for the services provided by the payload 82. MCU 70 also reads, at 708, a latitude value and a longitude value from the GPS 60. MCU 70 then packs these values, along with a unique platform identifier, into a signal according to a known communications protocol and broadcasts the signal via transmitter 80 within the current time slot. Control is returned to the top of the loop of flowchart 700.

The clock is again read at 702 and the clock value is checked at 704 to determine if the current time slot corresponds to the slot for this particular platform. If sufficient time has elapsed that a successive time slot has now been entered, the test evaluates negatively (which will continue to be the case for the remainder of the clock cycle). MCU 70 via receiver 79 listens at 710 for a signal associated with the aerial platform 92 that is assigned to broadcast during the current time slot. If at 712 it is determined that a signal has been received, then control is passed to a routine at 714 that extracts from the signal according to known methods the transmitted information. For example, the unique identifier (ID) for the aerial platform that broadcast the received signal is extracted from the received signal. Given that each aerial platform has a unique time slot, the identity of the aerial platform could be inferred from the timing of its signal. The use of a unique identifier may serve as a check for this inference, or may provide other information useful for administering the network. Other information in transmitted signal 95 or received signal 90 may include latitude and longitude information and an operational status (which in turn may incorporate a measure of demand for the services of the payload of that aerial platform). When the desired information has been extracted from the received signal, MCU 70 retrievably stores this information at 716 in memory 59 in accordance with known methods.

If at 712 it had been determined that a signal had not been received during the time slot, MCU 70 may at 718 store a code associated with the aerial platform 92 assigned to the present time slot to indicate that that particular aerial platform 92 is either out of range or not operating properly.

The logic implemented by MCU 70 then checks at 720 whether all time slots have been cycled through. If so, then the logic implements the control strategy. A set of closest platforms, e.g., five of them, are determined by executing a sort routine that compares the distances that were previously determined. For example, MCU 70 at 722 runs a fuzzy control algorithm on the data received from the other aerial platforms during the past clock cycle. As described below, the control strategy takes from memory 59 the values received from the other aerial platforms 92 and arrives at a control action that implements a desired objective function for the communications network. The control action is sent, at 724, by MCU 70 to auto pilot 73, which effectuates the desired aerial platform control.

If at 720 all aerial platforms 92 had not yet been accounted for (i.e., if the clock cycle is not yet complete), MCU 70 increments to the next platform clock slot at 726 (to which the clock will be compared once again at step 704).

Figures 8E, 8F, 8G:
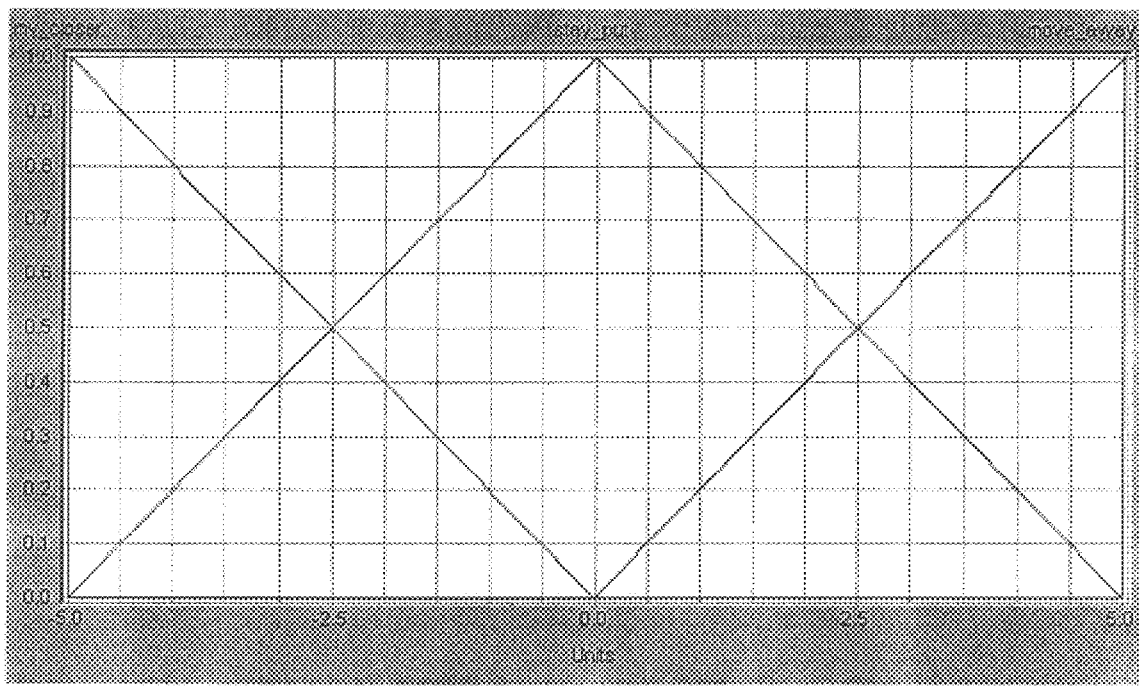

The fuzzy algorithm approach is illustrated in FIGS. 8A–8L and is applied to the information received from each of the five closest platforms. FIG. 8A provides a table that describes certain parameters of the fuzzy algorithm used in the illustrated embodiment of the control logic for the aerial platforms 92 according to the present invention. The algorithm uses two linguistic input variables (proximity and demand), one linguistic output variable (control command or "control_com"), and no intermediate variables (the fuzzy logic directly maps the input variables to the output variable). The fuzzy algorithm uses a single rule block (FIG. 8L, below), which comprises nine rules. Finally, the fuzzy algorithm uses nine membership functions, defined below.

FIG. 8B provides a definition of the fuzzy logic system, which is a simple one that maps the two input variables, proximity and demand, to the output variable, control_com. The "min" and "max" features clip or block inputs that are beyond these ranges according to known methods.

FIG. 8C is a table that describes the linguistic variables of the fuzzy logic system, their type and the names of values that the variables can take. "Demand" is an input variable that can take any one of the values {low, medium, high}. "Proximity", also an input variable, takes the values {close, optimal, far}. The third variable, "control_comand", is an output variable that can take any of the values {mv_closer (i.e., propel a given aerial platform 92 closer to another platform), stay_put (i.e., do not effect a control action in an attempt to move a given aerial platform 92 relative to the other platforms) and move_away (i.e., propel the given aerial platform 92 away from another platform)}.

FIG. 8D is a table that sets forth the properties of the input variables. The "demand" input variable has a minimum value of 0, a maximum value of 255 (this value, in the illustrated embodiment, being selected based on mission-driven considerations and represented in a digital 8-bit value), and units (here, "demand" is dimensionless and simply identified as "units"). The column "fuzzification" refers to the process of using fuzzy sets for translating real variable or data into linguistic variables and, in the case of the "demand" input variable, applies a membership function (described below at FIG. 8H) to translate the numeric quantity into a set of memberships. These memberships are defined in the interval {0, 1} for each of the terms {low, medium, high}.

"Proximity", as set forth in FIG. 8D, can be as low as 0 and as high as 1000 miles (higher values being disregarded or not entered). For purposes of the illustrative embodiment of the communications network comprising aerial platforms 92 using this algorithm, an inter-platform separation of 1000 miles is deemed excessive; however, one skilled in the art would recognize that this setting can be varied depending upon the specifics and mission demands of the particular communications network. The "proximity" value is mapped via a membership function ("MBF", defined below at FIG. 8J) that maps the "proximity" value to a membership value of each of the terms {close, optimal and far}.

FIG. 8E sets forth the properties of the output variable "control_comand". "Control_comand" takes an integral value in the interval {−5, 5} and, if unspecified, assumes the default value 0. The units are dimensionless. "Defuzzification" means that the membership function for "control_comand" is entered at the abcissa and values for {mv_closer, stay_put, move_away} are taken from the membership function curves set forth in FIG. 8F.

FIG. 8F represents the membership function for the output variable "control_comand". The membership function graphically shows the dependence of the value of each of the term names {mv_closer, stay_put, move_away} on the value of "control_comand". The functional dependencies shown in FIG. 8F are illustrated in a different form in FIG. 8G. FIG. 8G is a table that, for each term name for the output variable "control_comand", identifies the shape of the curve and lists the definition points in coordinate pairs of the form {control_comand, term name}.

FIG. 8H illustrates the membership function for the input variable "demand", showing how the values for the term names "low", "medium" and "high" vary with the value of "demand". FIG. 8I provides a definition of the same membership function in tabular form. FIGS. 8J and 8K provide analogous membership functions and table representation for the input variable "proximity."

FIG. 8L is a rule block for the fuzzy control algorithm for the illustrative embodiment of the aerial platform 92 according to the present invention. The table illustrates the rules for a logical IF-THEN mapping from {"demand", "proximity"} to {"control_comand"}. The column labelled DoS (degree of support) provides a weighting for each rule according to its importance. If "demand" is low or medium and "proximity" is close, then "control_comand" takes the value move_away. If "demand" is high and proximity is close, or if "proximity" is optimal and "demand" is either low or medium, then "control_comand" takes the value stay ut. If "demand" or "proximity" take any other combination of states, "control_comand" takes the value mv_closer.

The output control command ("control_comand") of the embodiment of fuzzy logic algorithm described above is a numerical value between −5 and +5 for each of the closest vehicles. The rule block of FIG. 8L produces control commands taking one of three values {move_away, stay_put, mv_closer}, which are mapped into a numerical domain {−5≦x≦5} by the membership plot shown in FIG. 8F. MCU 70 then selects the highest absolute control value arrived at for a set of neighboring aerial platforms 92, e.g., each of the five closest platforms, and uses this as the basis for computing a required heading for aerial platform 92. If there is no unique highest absolute value, but rather two or more such values, no control action is taken. If there is a unique highest absolute value, the sign of the value determines the direction of the control to be taken. If the sign is negative, this means that there is a particular neighboring aerial platform 92 sufficiently far from the given aerial platform 92, or having sufficient demand (or both) that the appropriate control action is to move closer to this furthest neighboring platform in the list of five. The heading is determined according to known methods by computing the direction of a vector from the position of the given aerial platform 92 to the furthest of the five neighboring aerial platforms 92.

If the sign of the control command is positive, this indicates that there is a neighboring platform sufficiently close to the given aerial platform 92, or its demand is sufficiently low (or both), that the appropriate control action is to move away from this platform. Specifically, the control action is determined as the average position of the two closest aerial platforms 92, so as to direct the given aerial platform 92 in a direction 180 degrees opposite to that position.

The foregoing control strategy, when implemented aboard the aerial platforms 92 in a communication network, produces a distribution of platforms capable of adjusting to terrestrial demand and changing wind conditions. Those familiar with the study of emergent behaviors of complex systems would recognize that embodiments of the present invention analogous to the one described above would lead to a system that directs itself toward an efficient solution with minimal centralized control and processing power.

Many alternative strategies can be employed to achieve the desired controlled drift and distribution of aerial platforms 92 in a communications network according to the present invention, depending upon the operational goals and constraints of the aerial platforms, their payload and the mission of the network. As one alternative, the network could be monitored or even controlled by one or more ground stations (such as station 550 in FIG. 5). A software program such as Satellite Tool Kit, marketed by Analytical Graphics, Inc., King of Prussia, Pa., developed for analyzing satellite network interactions with aircraft, ships, ground vehicles and ground stations is adaptable for monitoring, predicting and controlling movements of the slow moving, low altitude network according to the present invention.

The number of aerial platforms necessary for establishing and maintaining an uninterrupted global link depends on a set of factors that includes deployment altitude, frequency spectrum allocation, seasonal conditions and the power of transmitters on the ground as well as on the aerial platforms. In general, the lower the altitude at which the aerial platforms are deployed, the larger the number of aerial platforms necessary for providing coverage that encircles the earth; the higher the altitude of a platform, the larger the area on the earth to which the platform is accessible via line of sight communications. This and signal attenuation in denser atmosphere are the primary reasons that, as the deployment altitude decreases, the greater the number of aerial platforms required.

Figure 9:
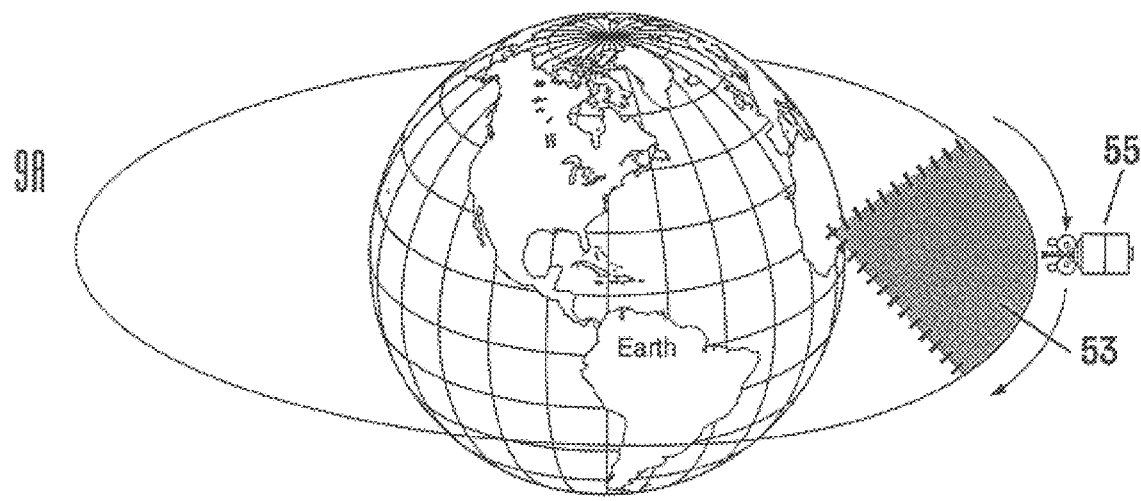
FIG. 9A shows an orbital satellite and a zone over which the satellite can effectively communicate with a point on the earth.
FIG. 9B shows an orbital satellite, an aerial platform with which the orbital satellite is in communication, and a zone over which the orbital satellite can effectively communicate with a point on earth via the aerial platform.
Figure 9:
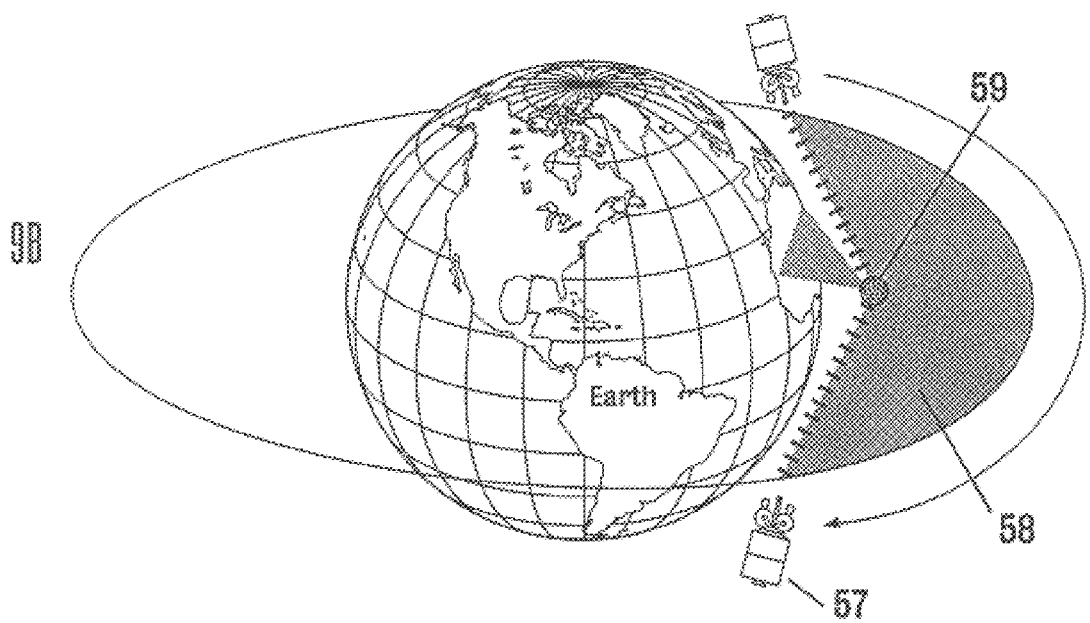

FIG. 9A shows an orbital, non-geosynchronous satellite 55 and a zone 53, with an associated duration in time over which the satellite can effectively communicate with a point on the earth. FIG. 9B shows how an aerial platform 59 deployed in the stratosphere, used in conjunction with satellite 57 to provide the satellite with a communication link to the earth using known communication methods, extends the zone 58 and time over which satellite 57 can effectively communicate with a point on the earth. The use of a combination of orbiting satellites and aerial platforms according to the present invention may be used to establish a global communications network more quickly than by deploying a network comprising solely orbiting satellites or aerial platforms.

The foregoing description is provided for purposes of explanation and description of illustrative embodiments of the present invention. Modifications and adaptations to the described embodiments, particularly to the aerial platform architecture, or to the control strategy for the aerial platforms, will be apparent to those skilled in the art and may be made without departing from the scope or spirit of the invention as described and as set forth in the following claims.

What is claimed is:

1. A communications network for providing communications coverage around the earth, the network comprising:

a multiplicity of aerial platforms distributed around the earth in the stratosphere approximately 18–45 km above the earth, each platform permitted to drift within the stratosphere but maintained within line of sight distance from the adjacent neighboring platforms;

a ground station for communicating control signals to any two platforms for substantially increasing the distance between said two platforms while maintaining communication links with said two platforms;

each aerial platform comprising a lighter than air portion and a heavier than air portion suspended from the lighter then air portion;

each platform comprising means for directional propulsion in response to a control signal and for remaining airborne for a period of time, said platform including communications electronics for sending communication signals to and receiving them from other aerial platforms, and control electronics coupled to the communications electronics, said control electronics adapted to generate a control signal for directing the platform to another location in response to communication signals received from another platforms.

2. The communications network according to claim 1, in which each platform is adapted to adjust its position with respect to the other platforms according to a decision rule and the decision rule operates on information received from at least one of a set of neighboring platforms.

3. The communications network according to claim 2, wherein each platform is assigned a slot in a clock cycle and transmits to the other platforms, during that slot, information to be used according to the decision rule.

4. The communications network according to claim 2, in which the adjustment is determined according to a measure of physical proximity to at least one of the neighboring platforms.

5. The communications network according to claim 2, in which the adjustment is determined according to a measure of demand for the services of at least one of the neighboring platforms.

6. The communications network according to claim 2, in which the set of neighboring platforms for a given platform is determined according to a measure of physical proximity to the given platform and a measure of demand for service of the given platform.

7. The communications network of claim 1, wherein at least one of the platforms comprises a payload adapted for communication with equipment located on the earth.

8. The communications network of claim 7, wherein the equipment located on the earth comprises a ground-based telecommunications station.

9. The communications network of claim 7, wherein the equipment located on the earth comprises sea-based communications equipment.

10. The communications network of claim 1, wherein at least one of the platforms comprises a payload adapted for communication with communications equipment aboard an airborne vehicle.

11. The communications network of claim 1, wherein the platforms are adapted for communication with at least one satellite in orbit around the earth.

12. The communications network of claim 1, wherein at least one of the platforms comprises a payload adapted for observation.

13. The communications network of claim 12, wherein the payload is adapted for taking photographs.

14. The communications network of claim 1, in which the aerial platforms are distributed within a latitude range that extends from about 15° South latitude to about 15° North latitude.

15. The communications network of claim 1, in which the aerial platforms are distributed within a latitude range that extends from about 15° degrees North latitude to approximately the Arctic Circle.

16. The communications network of claim 1, in which the aerial platforms are distributed within a latitude range that extends north of approximately the Arctic Circle to the North Pole.

17. The communications network of claim 1, in which aerial platforms are distributed within a latitude range that extends from about 15° degrees South latitude approximately to the Antarctic Circle.

18. The communications network of claim 1, in which the aerial platforms are distributed within a latitude range that extends south of approximately the Antarctic Circle to the South Pole.

* * * * *